United States Patent
Ikeda et al.

(10) Patent No.: US 8,027,586 B2
(45) Date of Patent: Sep. 27, 2011

(54) PASSIVE OPTICAL NETWORK SYSTEM AND OPTICAL LINE TERMINATING APPARATUS

(75) Inventors: Hiroki Ikeda, Hachioji (JP); Masahiko Mizutani, Yokohama (JP); Toshiki Sugawara, Kokubunji (JP); Shinobu Gohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 12/071,490

(22) Filed: Feb. 21, 2008

(65) Prior Publication Data
US 2009/0097861 A1  Apr. 16, 2009

(30) Foreign Application Priority Data
Oct. 11, 2007 (JP) .................................. 2007-265777

(51) Int. Cl.
*H04J 14/00* (2006.01)
(52) U.S. Cl. .................... 398/70; 398/71; 398/72
(58) Field of Classification Search .............. 398/58, 398/66–68, 70, 72, 74, 75
See application file for complete search history.

(56) References Cited

U.S. PATENT DOCUMENTS

| | | | | |
|---|---|---|---|---|
| 5,559,624 | A * | 9/1996 | Darcie et al. ............ | 398/72 |
| 7,321,730 | B2 * | 1/2008 | Felske et al. ........... | 398/71 |
| 2003/0103522 | A1 | 6/2003 | Hane | |
| 2006/0133809 | A1 * | 6/2006 | Chow et al. ............ | 398/66 |
| 2007/0110441 | A1 | 5/2007 | Saito et al. | |

FOREIGN PATENT DOCUMENTS

| | | |
|---|---|---|
| JP | 2000-165368 | 6/2000 |
| JP | 2002-185989 | 12/2000 |
| JP | 2003-174462 | 6/2003 |
| JP | 2007-135026 | 5/2007 |

OTHER PUBLICATIONS

"Gigabit-Capable Passive Optical Networks (GPON): General Characteristics", ITU-T, G.984.1 (Mar. 2003), Series G: Transmission Systems and Media, Digital System and Networks, pp. i-iii and 1-14.

(Continued)

*Primary Examiner* — Dalzid Singh
(74) *Attorney, Agent, or Firm* — Stites & Harbison PLLC; Juan Carlos A. Marquez, Esq.

(57) ABSTRACT

A passive optical network (PON) system which enables plural types of ONUs having different signal transmission speeds to be connected to one OLT. An optical line terminating apparatus (OLT) connected to plural types of ONUs having different signal transmission speeds through an optical distribution network includes an optical transmitter-receiver connected to the optical distribution network, a transmission/reception line interface connected to a wide area network, a downstream frame processing section for converting a packet received by the transmission/reception line interface from the wide area network into a downstream frame containing identification information on a destination ONU in a header, and a downstream transmission controller for modulating the downstream frame at a speed corresponding to a signal transmission speed of the destination ONU and outputting the modulated frame to an electrical/optical converter connected to the optical transmitter-receiver.

9 Claims, 13 Drawing Sheets

OTHER PUBLICATIONS

"Gigabit-Capable Passive Optical Networks (GPON): Physical Media Dependent (PMD) Layer Specification", ITU-T, G.984.2 (Mar. 2003), Series G: Transmission Systems and Media, Digital System and Networks, pp. i-iii and 1-29, and Amendment 1, pp. i-iv and 1-3.

"Gigabit-Capable Passive Optical Networks (GPON): Transmission Convergence Layer Specification", ITU-T, G.984.3 (Feb. 2004), Series G: Transmission Systems and Media, Digital System and Networks, pp. i-iv and 1-107, and Amendment 1, pp. i-iv and 1-38, and Amendment 2, pp. i-iii and 1-5, and Amendment 3, pp. i-iii and 1-4.

Office Action from Japanese Patent Office in corresponding Japanese Application No. 2007-265777, dated Jul. 23, 2010, in Japanese.

* cited by examiner

OLT 10

ONU MANAGEMENT TABLE

| ONU IDENTIFIER | SIGNAL TRANSMISSION SPEED (CLOCK FREQUENCY) |
|---|---|
| 20-1 | 2.4 Gbps |
| 20-2 | 10 Gbps |
| 20-3 | 2.4 Gbps |
| ⋮ | ⋮ |

FIG. 5B

| ONU IDENTIFIER | SIGNAL TRANSMISSION SPEED (CLOCK FREQUENCY) | PRIORITY |
|---|---|---|
| 20-1 | 2.4 Gbps | HIGH |
| 20-2 | 10 Gbps | HIGH |
| 20-3 | 2.4 Gbps | LOW |
| ⋮ | ⋮ | ⋮ |

FIG. 8A  2.4 Gbps BIT-STRING SIGNAL
FIG. 8B  10 Gbps HIGH-SPEED ELECTRICAL SIGNAL
FIG. 8C  OPTICAL SIGNAL IN PON SECTION
OPTICAL SIGNAL FOR 2.4 Gbps

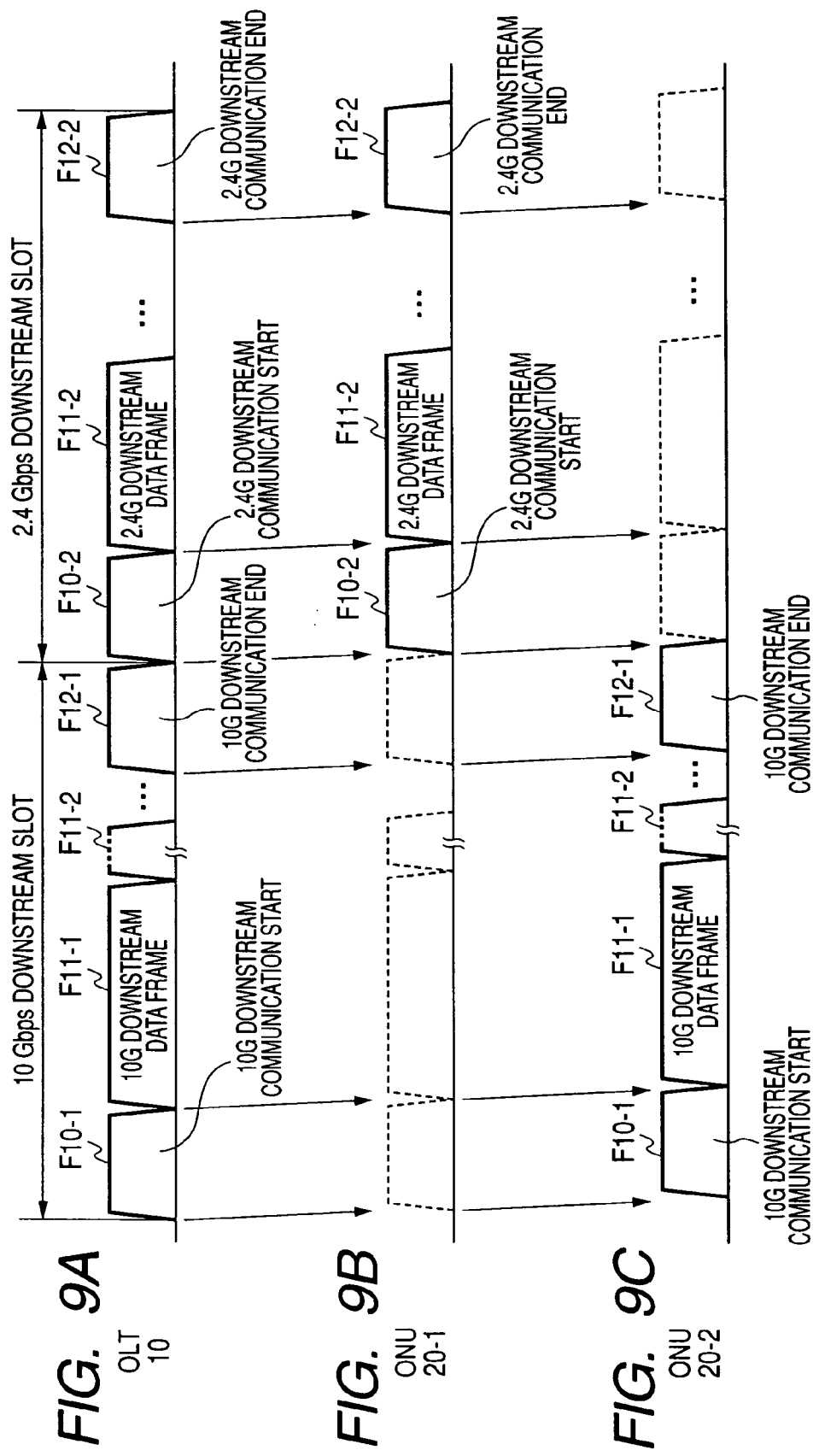

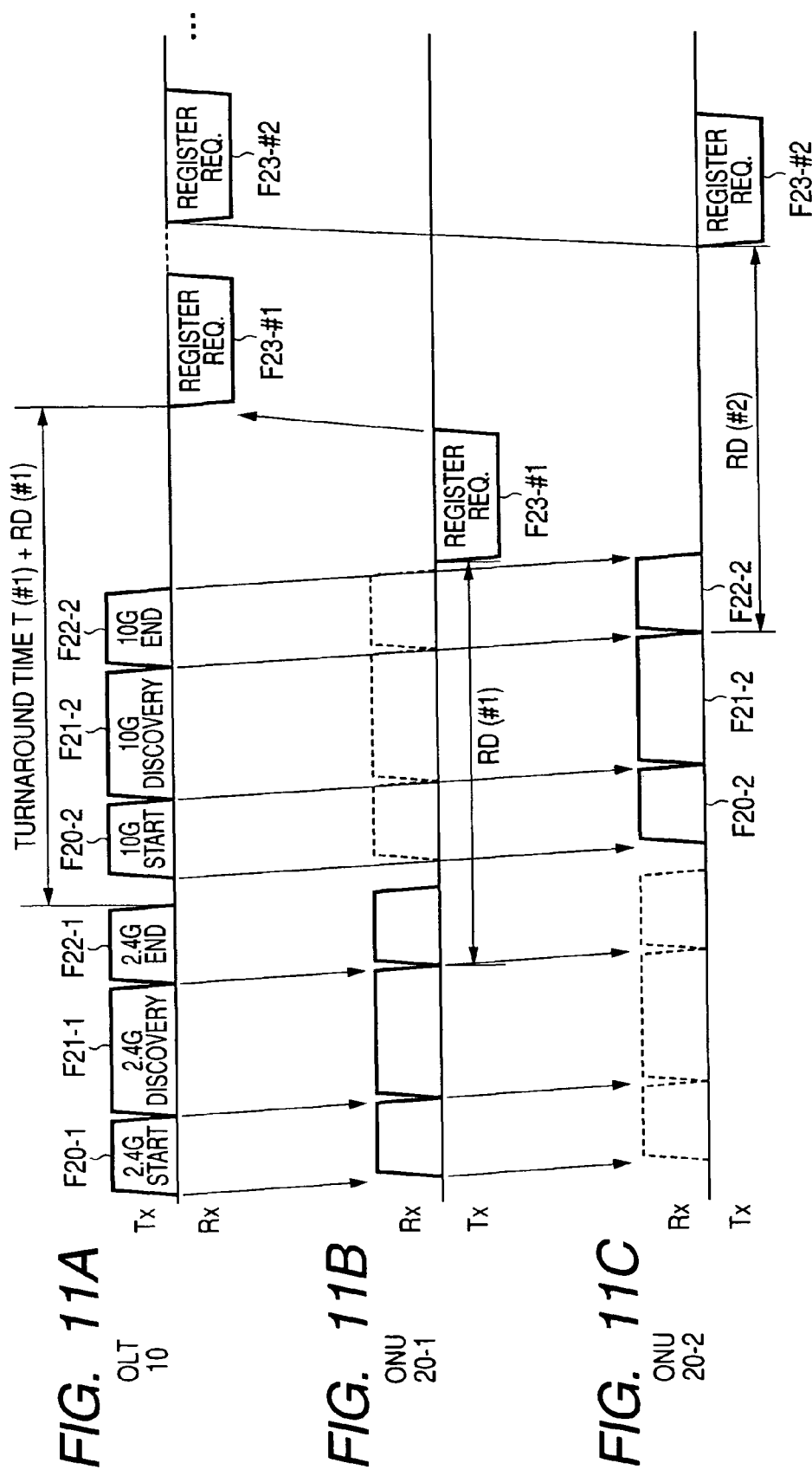

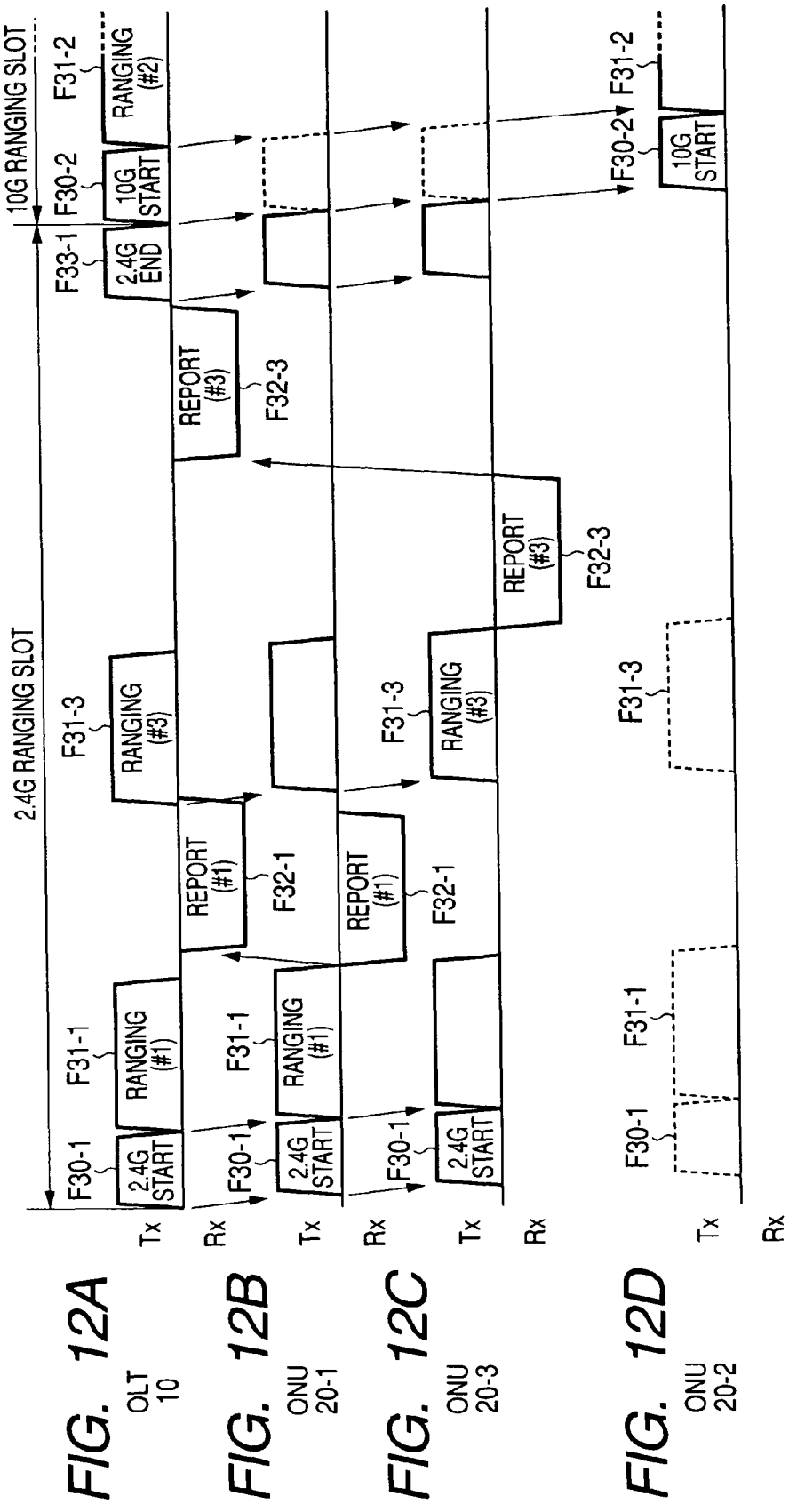

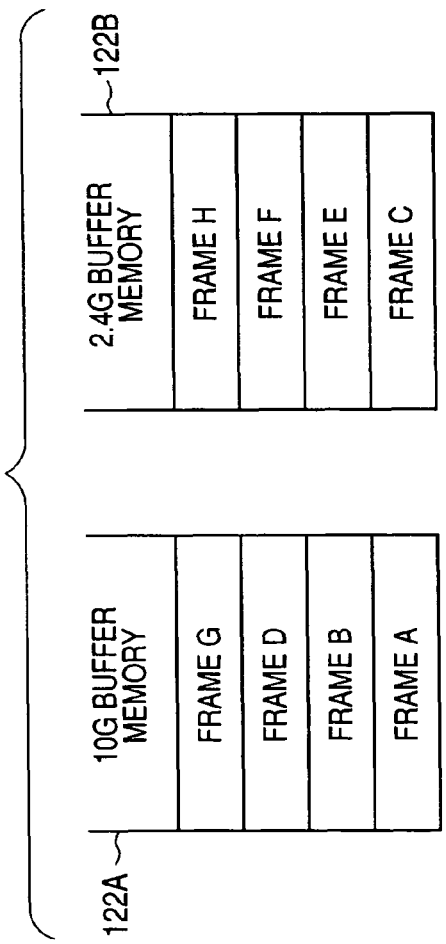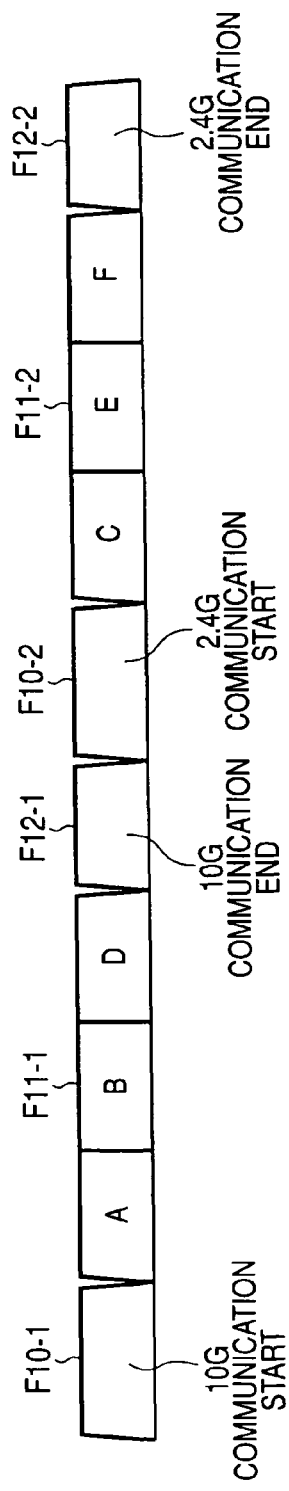

US 8,027,586 B2

PASSIVE OPTICAL NETWORK SYSTEM AND OPTICAL LINE TERMINATING APPARATUS

CLAIM OF PRIORITY

The present application claims priority from Japanese application JP 2007-265777 filed on Oct. 11, 2007, the content of which is hereby incorporated by reference into this application.

FIELD OF THE INVENTION

The present invention relates to a high-speed optical access network, and more particularly, to a passive optical network (PON) system which can provide high-speed Internet service to individual households over optical fibers and an optical line terminating apparatus (OLT) applied to the PON system.

BACKGROUND OF THE INVENTION

In an internet protocol (IP) network, besides audio communication and data service, video distribution service requiring high-speed data transmission such as triple-play service in which broadcasting, telephone, and data communication are integrated is becoming active. Internet protocol television (IPTV) in triple-play service is one of the most important broadband applications.

A passive optical network (PON) system provides high-speed broadband Internet access using an optical fiber network to user terminals placed in individual households. The PON system is composed of plural optical network units (ONUs) each placed in a user's home and accommodating at least one user terminal and an optical line terminating apparatus (OLT) connected to these ONUs through an optical fiber network.

The optical fiber network of the PON system is composed of a trunk optical fiber connected to the OLT, plural branch optical fibers connected to the ONUs, and an optical splitter (or optical coupler) for joining the branch optical fibers and the trunk optical fiber, and takes the form of an optical distribution network (ODN) in which the plurality of ONUs can share the optical transmission line between the OLT and the optical splitter.

In the PON system, the cost of laying optical fibers can be greatly reduced compared to other broadband access technologies. Particularly in a G-PON (Gigabit-Capable PON) system, variable-length data frames can be transmitted at gigabit high speed, which can offer various broadband network applications to end users. Details of G-PON are disclosed in ITU-T G.984.1 "Gigabit-capable Passive Optical Networks (GPON): General characteristics", ITU-T G.984.2 "Gigabit-capable Passive Optical Networks (GPON): Physical Media Dependent (PMD) layer specification", and ITU-T G.984.3 "Gigabit-capable Passive Optical Networks (GPON): Transmission convergence layer specification."

SUMMARY OF THE INVENTION

However, in related PON systems, only ONUs having the same signal transmission speed as that of the OLT can be connected to the OLT. Accordingly, in the case where an OLT having higher transmission speed is adopted to achieve high-speed information distribution service, there is a problem that existing low-speed ONUs cannot be connected thereto.

For example, a 2.4 Gbps-compliant ONU in the G-PON standard can communicate only with a 2.4 Gbps-compliant OLT. Accordingly, when a communication common carrier introduces a new 10 Gbps-compliant OLT in Internet access service, an existing 2.4 Gbps-compliant ONU which cannot transmit and receive 10-Gbps optical signals due to the different clock frequencies cannot access the Internet through the 10 Gbps-compliant OLT. Since there are many ONUs installed in the PON system, replacing existing low-speed ONUs with high-speed ONUs in accordance with the enhanced speed of the OLT brings about an enormous economic burden.

In the PON system, with the progress of the speed enhancement technology, the communication speed of the OLT and ONU is increased from 2.4 Gbps to 10 Gbps or higher. However, once the PON system is in operation, the cost for replacing existing ONUs with high-speed ONUs becomes enormous as described above. This makes it practically difficult for a communication common carrier to replace the existing OLT with a new OLT having higher speed in order to offer high-speed information distribution service to users. That is, in the PON system, there is a problem that plural types of ONUs having different signal transmission speeds cannot be connected to the OLT.

As a related technique, for example JP-A No. 2002-185989 proposes that in a 1-to-M transmission system in which subscribers time-share a common data bus for connecting a higher-level circuit to plural subscriber circuits, a clock frequency k times that of a time slot used by a low-speed subscriber circuit is used in a time slot assigned to a high-speed subscriber circuit. However, this related technique is based on time division multiplexing in which time slots are fixedly assigned to subscribers, and does not solve the above-described problem in the PON system in which each downstream frame transmitted from the OLT has a different destination ONU.

It is an object of the present invention to provide a passive optical network (PON) system which enables plural types of optical network units (ONUs) having different signal transmission speeds to be connected to one optical line terminating apparatus (OLT).

It is another object of the invention to provide an optical line terminating apparatus (OLT) for a PON system which enables plural types of optical network units (ONUs) having different signal transmission speeds to be connected to the OLT.

In order to attain the above objects, in a PON system according to the invention, an optical line terminating apparatus (OLT) connected to plural types of optical network units (ONUs) having different signal transmission speeds through an optical distribution network includes an optical transmitter-receiver connected to the optical distribution network, a transmission/reception line interface connected to a wide area network, a downstream frame processing section for converting a packet received by the transmission/reception line interface from the wide area network into a downstream frame containing identification information on a destination ONU in a header, and a downstream transmission controller for modulating the downstream frame at a speed corresponding to a signal transmission speed of the destination ONU and outputting the modulated frame to an electrical/optical converter connected to the optical transmitter-receiver.

More specifically, the OLT according to the invention includes an ONU management table for storing the correspondence relationship between identification information on each ONU and signal transmission speed, and the downstream frame to be transmitted to the optical distribution network is modulated at a signal transmission speed corresponding to identification information on a destination ONU indicated by the ONU management table.

According to one aspect of the invention, the downstream frame processing section stores, in a buffer memory, downstream frames grouped according to signal transmission speed indicated by the ONU management table, and the downstream transmission controller modulates a downstream frame read from the buffer memory at a speed corresponding to a signal transmission speed and outputs the modulated frame to the electrical/optical converter.

Further, the ONU management table stores signal transmission speed and priority in association with identification information on each ONU, and the downstream frame processing section stores, in a buffer memory, downstream frames grouped according to signal transmission speed and according to priority indicated by the ONU management table, so that the downstream transmission controller can read, in order of priority, a downstream frame stored according to signal transmission speed in the buffer memory and modulate the read frame at a speed corresponding to a signal transmission speed.

According to an embodiment of the invention, plural types of ONUs having different signal transmission speeds can be accommodated in the same OLT; therefore, it becomes possible to replace an OLT in the PON system in operation with a new OLT having higher speed.

BRIEF DESCRIPTION OF THE DRAWINGS

FIGS. 5A and 5B are diagrams showing an ONU management table included in the OLT 10, in which FIG. 5A shows an ONU management table for storing the correspondence relationship between ONU identification information and signal transmission speed, and FIG. 5B shows an ONU management table for storing the correspondence relationship among ONU identification information, signal transmission speed, and priority;

FIG. 8A, FIG. 8B, and FIG. 8C are diagrams illustrating downstream transmission signals according to the second embodiment, in which FIG. 8A shows a bit string of a frame to be transmitted to a 2.4 Gbps-compliant ONU, FIG. 8B shows a bit string obtained by quadrupling the bit rate, and FIG. 8C shows a pseudo 10-Gbps optical signal;

FIG. 9A, FIG. 9B, and FIG. 9C are diagrams illustrating one example of the transmission sequence of downstream frames in the PON system according to the invention;

FIG. 11A, FIG. 11B, and FIG. 11C are diagrams showing a message sequence of discovery in the PON system;

FIG. 12A, FIG. 12B, FIG. 12C, and FIG. 12D are diagrams showing a message sequence of ranging in the PON system; and FIG. 13A and FIG. 13B are diagrams illustrating one example of a method for transmitting plural downstream frames together in one time slot.

DETAILED DESCRIPTION OF THE PREFERRED EMBODIMENTS

Hereinafter, embodiments of the present invention will be described with reference to the accompanying drawings. Although in the following embodiments, the invention is applied to ITU-T G-PON, it is also applicable to other PON systems than G-PON, for example, GE-PON (Gigabit-Ethernet PON) which is suitable for information transfer by Ethernet (registered trademark) frames, and B-PON (Broadband PON) which transfers information by fixed-length ATM cells in a PON section.

Figure 1:
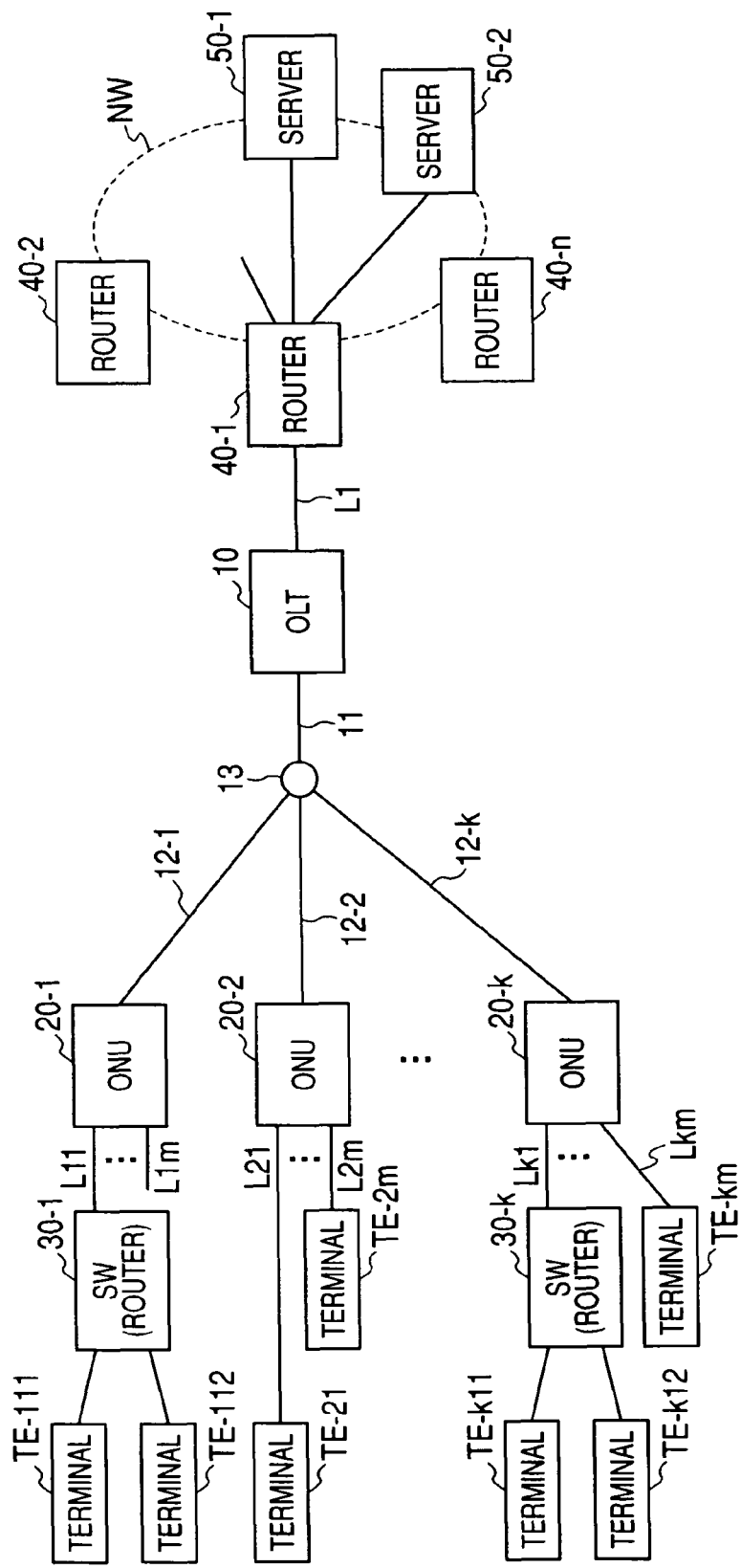
FIG. 1 is a block diagram of a PON system to which the present invention is applied.

FIG. 1 is a block diagram of a PON system to which the invention is applied. The PON system is composed of an optical line terminating apparatus (OLT) 10, plural optical network units (ONUs) 20 (20-1 to 20-k), and an optical distribution network (ODN) in a PON section which connects these elements. The optical distribution network in the PON section includes a trunk optical fiber 11 connected to the OLT 10 and a branch optical fiber 12-$i$ (i=1 to k) connected to the ONU 20-$i$. The branch optical fiber 12-$i$ is branched from the trunk optical fiber 11 by an optical splitter (optical coupler) 13. The OLT 10 is usually installed in a user line accommodation office of a carrier or an ISP (Internet Service Provider), and the ONU 20-$i$ (i=1 to k) is installed in an office building, a condominium building, or a user's home.

The ONU 20-$i$ has plural user connection lines Lij (j=1 to m), and accommodates plural user terminals TE through these connection lines. User terminals, for example as shown by TE-111 and TE-112 (TE-k11 and TE-k12), may be connected to the ONU 20-1 (20-$k$) through a home router or home switch 30-1 (30-$k$), and for example as shown by TE-21 and TE-2$m$ (TE-km), may be directly connected to the ONU 20-2 (20-$k$).

Reference numeral NW denotes a wide area network (including an ISP network) composed of plural routers 40 (40-1 to 40-$n$). Each user terminal TE connected to the PON system communicates through the ONU 20-$i$, the OLT 10, and the router 40-1 with servers 50 (50-1 and 50-2) connected to the wide area network NW.

In FIG. 1, for simplicity's sake, the servers 50-1 and 50-2 are directly connected to the router 40-1. However, in an actual network, other routers can exist between the servers 50-1 and 50-2 and the router 40-1. Although not shown in FIG. 1, many servers accessible from each user terminal in addition to the servers 50-1 and 50-2 exist in the network NW.

When the OLT 10 receives a frame transmitted from e.g. the server 50-2 and addressed to the user terminal TE-111 via the router 40-1 and a communication line L1, the OLT 10 converts the received frame into a frame format (GEM frame in G-PON) complying with a transmission layer protocol specific to the PON section, and transmits it to the optical fiber 11. In the PON section, a downstream frame transmitted from the OLT 10 to the optical fiber 11 is branched by the splitter 13 into the branch optical fibers 12-1 to 12-$k$ to be broadcast to all the ONUs 20-1 to 20-$k$.

Each ONU 20-$i$ is assigned a unique port ID in the PON. Each ONU refers to destination identification information (port ID) indicated by the header (GEM header in G-PON) of a received frame, performs reception processing on a frame in which the destination identification information matches its own port ID or the destination identification information indicates a multicast port ID, and discards received frames that do not match the above condition. A GEM frame containing the frame addressed to the user terminal TE-111 is provided with a GEM header containing a port ID unique to the ONU 20-1. Accordingly, only the ONU 20-1 performs reception processing on this GEM frame. The ONU 20-1 removes the GEM header from the GEM frame, and forwards the received frame to the connection line L11 for the user terminal TE-111 in accordance with destination information indicated by the header of the received frame.

On the other hand, upstream frames headed for the network NW from the ONUs 20-1 to 20-k are transmitted using individual transmission time slots assigned to the ONUs in advance by the OLT 10 to avoid a collision on the optical fiber 11 to the OLT 10, with the upstream frames being time-division-multiplexed on the optical fiber 11. The OLT 10 forwards upstream frames received through the optical fiber 11 to the router 40-1 after converting the format as necessary.

In the invention, plural ONUs having different signal transmission speeds are connected to the OLT 10. In the description below, assume that each of the ONUs 20-1 to 20-k has a signal transmission speed of either 2.4 or 10 Gbps.

Figure 2:
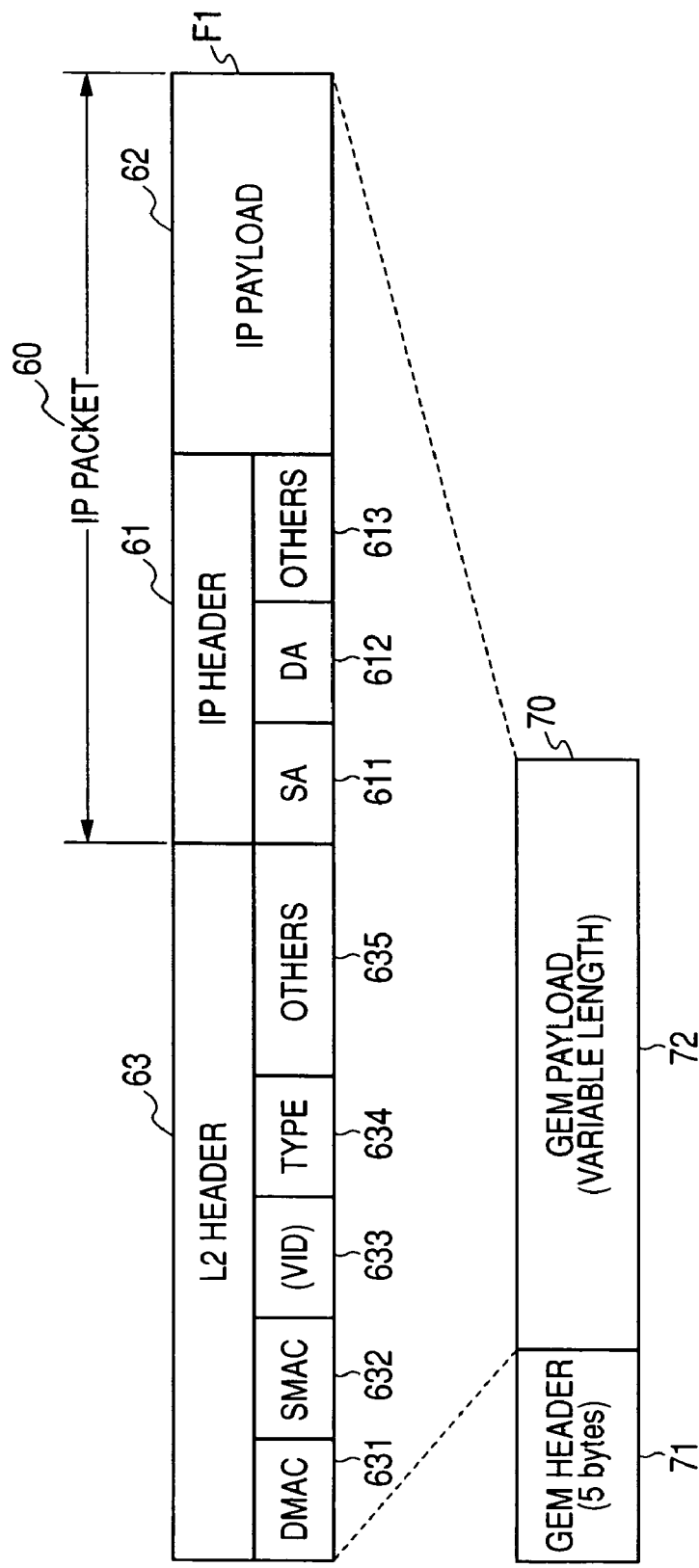
FIG. 2 is a diagram showing the format of a downstream frame received by an OLT 10 from a router in a network NW and the format of a GEM frame transmitted in a PON section.

FIG. 2 shows the format of a downstream communication frame F1 received by the OLT 10 from the router 40-1 and the format of a downstream GEM frame 70 in the PON section assuming that the communication protocol between a user terminal and an ONU and the communication protocol between the OLT 10 and the router 40-1 are Ethernet.

The reception frame F1 from the router 40-1 is composed of an IP packet 60 and an L2 header 63. The IP packet 60 is composed of an IP header 61 and an IP payload 62. The IP header 61 contains a source IP address (SA) 611, a destination IP address (DA) 612, and the other header information.

The source IP address (SA) 611 of the IP header indicates the source of the IP packet, for example, the IP address of the server 50-1, and the destination IP address (DA) 612 indicates the IP address of the user terminal which is the destination of the IP packet.

In this embodiment, the L2 header 63 is an Ethernet header and contains a destination MAC address (DMAC) 631, a source MAC address (SMAC) 632, a protocol type 634, and the other header item 635. In this embodiment, a value indicative of an IP packet is set in the protocol type 634 indicative of the type of the packet. Further, the DMAC 631 indicates the MAC address of the user terminal which is the destination of the Ethernet frame, and the SMAC 632 indicates the MAC address of the router 40-1 which is the source of the Ethernet frame. In the case where the user terminal transmits and receives a frame by using a VLAN (Virtual LAN) formed between the user terminal and the router 40-1 in order to enhance the security of communication, the L2 header 63 contains a VLAN identifier (VID) 633.

The downstream GEM frame 70 in the PON section is composed of a 5-byte GEM header 71 and a variable-length GEM payload 72. The downstream frame in the PON section undergoes reception control in accordance with a port ID contained in the GEM header 71. The OLT 10 sets the reception frame F1 from the router 40-1 in the GEM payload 72, and sets in the GEM header 71 a port ID for specifying an ONU that is to receive the reception frame F1. If the reception frame F1 from the router 40-1 is a multicast frame to be received by all the ONUs connected to the optical fiber 11, the OLT 10 sets the reception frame F1 from the router 40-1 in the GEM payload 72, and sets a predetermined multicast port ID in the GEM header 71.

Figure 3:
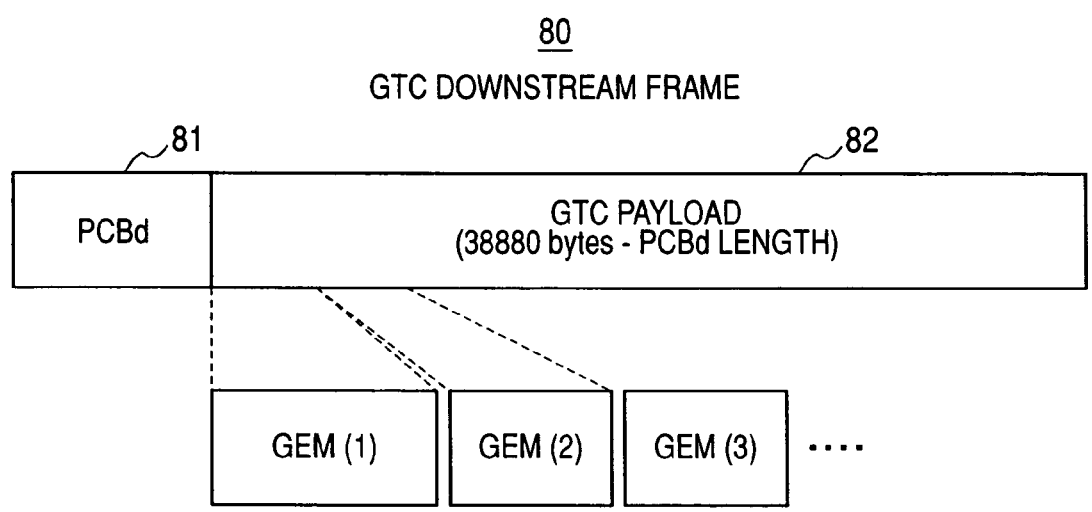
FIG. 3 is a diagram illustrating the format of a GTC frame transmitted from the OLT 10 to an optical fiber network in the PON section.

FIG. 3 shows the format of a TC (Transmission Convergence) downstream frame (GTC frame in G-PON) 80 which is transmitted from the OLT 10 to the optical fiber 11.

The GTC downstream frame 80 is composed of a PCBd (Physical Control Block downstream) 81 and a GTC payload 82. The maximum length of the GTC downstream frame 80 is 38880 bytes in the case of G-PON. The GEM frame 70 illustrated in FIG. 2 is mapped in the GTC payload 82 as shown by GEM(1), GEM(2) in FIG. 3.

In this embodiment, one GTC downstream frame 80 transmits GEM frames addressed to 2.4-Gbps ONUs, and another GTC downstream frame 80 transmits GEM frames addressed to 10-Gbps ONUs.

Figure 4:
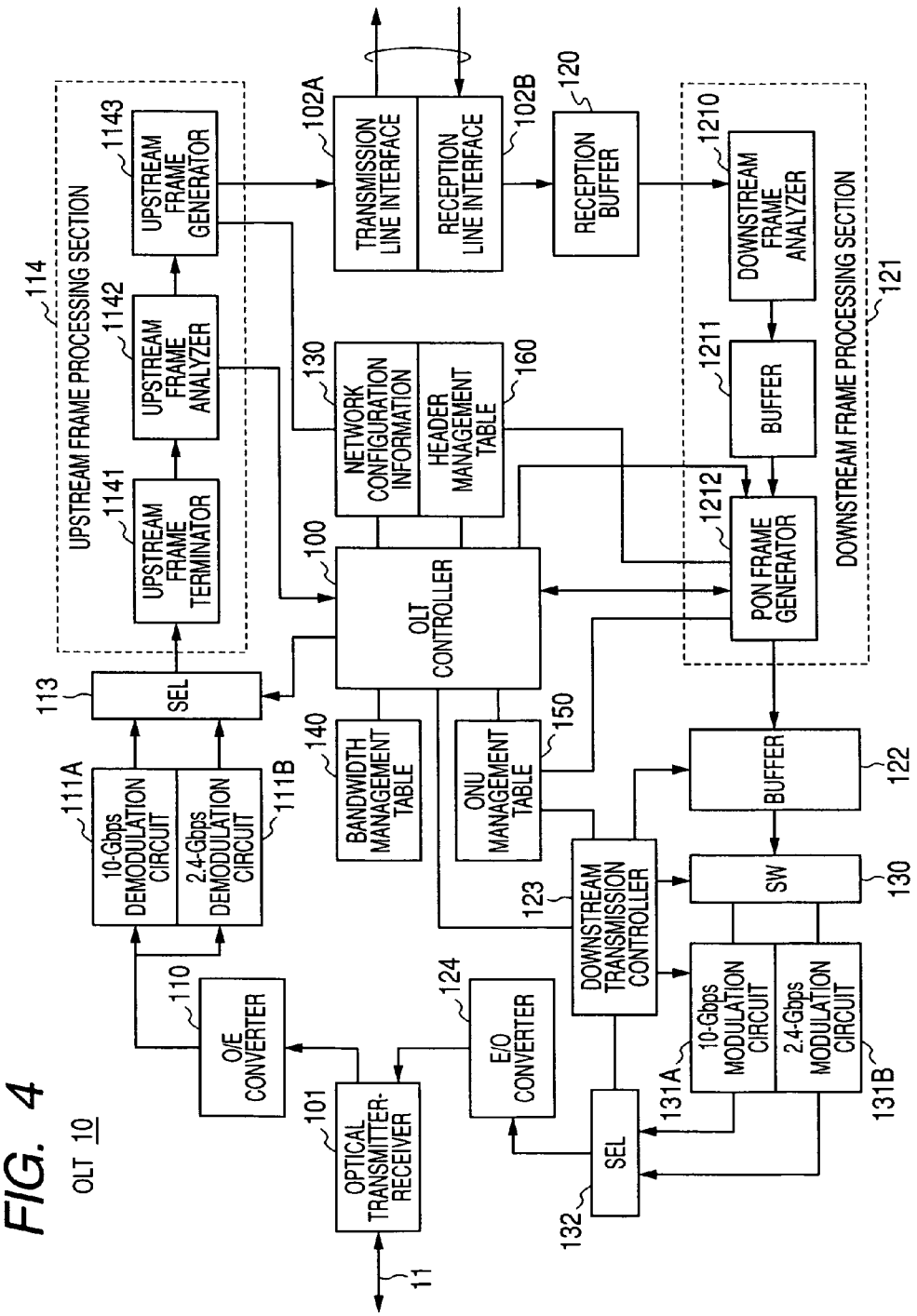
FIG. 4 is a block diagram of the OLT 10 according to a first embodiment of the invention.

FIG. 4 is a block diagram of the OLT 10 which can be connected to plural types of ONUs having different signal transmission speeds, according to a first embodiment of the invention.

The OLT 10 is composed of an OLT controller 100, an optical transmitter-receiver 101 connected to the trunk optical fiber 11, a transmission line interface 102A and a reception line interface 102B which are connected to the line L1 for the wide area network, an upstream signal processing circuit provided between the optical transmitter-receiver 101 and the transmission line interface 102A, and a downstream signal processing circuit provided between the optical transmitter-receiver 101 and the reception line interface 102B.

The upstream signal processing circuit is composed of an optical/electrical (O/E) converter 110 for converting an optical signal received by the optical transmitter-receiver 101 into an electrical signal, a demodulation section composed of a 10-Gbps demodulation circuit 111A and a 2.4-Gbps demodulation circuit 111B which are connected to the O/E converter 110, a selector 113 for selecting either of the outputs of the demodulation circuits 111A and 111B, and an upstream frame processing section 114 connected to the selector 113. The upstream frame processing section 114 is composed of an upstream frame terminator 1141 for reproducing an upstream frame from an output signal of the selector, an upstream frame analyzer 1142 connected to the upstream frame terminator 1141, and an upstream frame generator 1143 for converting a frame outputted from the upstream frame analyzer 1142 into a format complying with a protocol on the communication line L1.

The upstream frame analyzer 1142 analyzes an upstream reception frame. If the reception frame is a control frame in the PON section, the upstream frame analyzer 1142 outputs it to the OLT controller 100. If the reception frame is a user frame or a control frame to be forwarded to the router 40-1, the upstream frame analyzer 1142 forwards it to the upstream frame generator 1143.

If the protocol on the communication line L1 is ATM, the upstream frame generator 1143 converts the reception frame into an ATM cell group and forwards it to the transmission line interface 102A. Information necessary for frame format conversion is read from a network configuration information memory 130. In this embodiment, since the protocol on the communication line L1 is Ethernet and the upstream reception frame also is an Ethernet frame, the upstream frame generator 1143 forwards the Ethernet frame outputted from the upstream frame analyzer 1142 to the transmission line interface 102A without converting it.

On the other hand, the downstream signal processing circuit is composed of a reception buffer 120 for temporarily storing a downstream frame (downstream packet) received by the reception line interface 102B through the communication line L1, a downstream frame processing section 121 for converting a downstream frame read from the reception buffer 120 into a frame format specific to the PON section and outputting it, a buffer memory 122 for temporarily buffering a downstream PON frame outputted from the downstream frame processing section 121, a downstream transmission controller 123, an electrical/optical (E/O) converter 124, a switch 130 for selectively distributing a downstream frame read from the buffer memory 122 to either a 10-Gbps modulation circuit 131A or a 2.4-Gbps modulation circuit 131B, and a selector 132 for selectively supplying either of the output signals of the modulation circuits 131A and 131B to the E/O converter 124. The E/O converter 124 converts an output signal from the selector 132 into an optical signal and outputs it to the optical transmitter-receiver 101.

The downstream frame processing section 121 is composed of a downstream frame analyzer 1210 for analyzing a downstream frame read from the reception buffer 120, a buffer memory 1211 for temporarily buffering a frame outputted from the downstream frame analyzer 1210, and a PON frame generator 1212 for converting a downstream control frame (or control packet) supplied from the OLT controller 100 and a downstream user frame read from the buffer memory 1211 into a GEM frame.

The OLT controller 100 receives a control frame indicating the storage state of transmission data or a transmission data length from each ONU, and controls an upstream-frame transmission time slot to be assigned to each ONU in accordance with a bandwidth management table 140. The respective upstream-frame transmission time slot assigned to each ONU is notified to each ONU by a downstream control frame generated by the OLT controller.

An ONU management table 150 stores the correspondence relationship between ONU identifiers (port IDs) 151 and signal transmission speeds (clock frequencies) 152 as shown in FIG. 5A. A header management table 160 contains plural table entries indicating the correspondence relationship between destination addresses (DMAC) of downstream frames and port IDs to be set in GEM headers. For example, table entries containing the MAC addresses of the user terminals TE-111 and TE-112 in FIG. 1 store the port ID of the ONU 20-1.

The PON frame generator 1212 retrieves a port ID corresponding to DMAC indicated by the L2 header of a downstream frame from the header management table 160, determines a signal transmission speed (10 Gbps or 2.4 Gbps) corresponding to the port ID from the ONU management table 150, and generates a GEM header containing the port ID. With the addition of the GEM header, the PON frame generator 1212 converts a downstream user frame read from the buffer memory 1211 and a downstream control frame supplied from the OLT controller 100 into a GEM frame, and buffers the GEM frame grouped according to signal transmission speed in the buffer memory 122.

The downstream transmission controller 123 forms a TC frame (GTC frame in this embodiment) and transmits a GEM frame read from the buffer memory 122 by the payload of the TC frame. The downstream transmission controller 123 allows the switch 130 to selectively distribute a GEM frame read from the buffer memory 122 to either the modulation circuit 131A or 131B. A GEM frame read from a buffer area of a 10-Gbps clock frequency is modulated by the 10-Gbps modulation circuit 131A, and a GEM frame read from a buffer area of a 2.4-Gbps clock frequency is modulated by the 2.4-Gbps modulation circuit 131B. The downstream transmission controller 123 controls the selector 132 in conjunction with the switch 130 so that the selector 132 selectively outputs a signal modulated by the modulation circuit 131A or 131B to the E/O converter 124.

Figure 6:
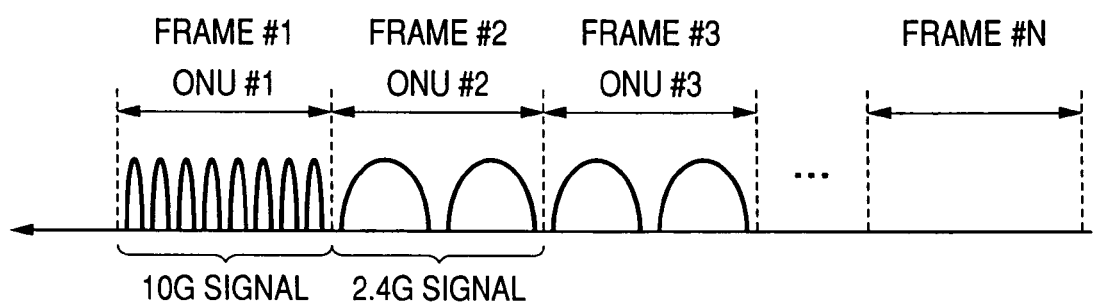
FIG. 6 is a diagram illustrating downstream transmission signals according to the first embodiment.

As described above, by selecting a modulation circuit to be applied in accordance with a port ID indicated by a GEM header, a GEM frame can be modulated at a frequency conforming to the signal transmission speed of a destination ONU, for example as shown schematically in FIG. 6. Downstream frames are forwarded to all the ONUs over the optical fiber network. With the above configuration, each ONU 20 can selectively perform reception processing on a GEM frame of its own port ID among GEM frames conforming to a respective signal transmission speed (clock frequency).

Since the OLT 10 allocates the transmission bandwidth of an upstream frame to each ONU 20, the OLT 10 can control the selector 113 in accordance with the reception timing of an upstream frame from each ONU. Accordingly, the selector 113 selects the output of the 10-Gbps demodulation circuit 111A at the reception of an upstream frame from an ONU having a signal transmission speed of 10 Gbps, and selects the output of the 2.4-Gbps demodulation circuit 111B at the reception of an upstream frame from an ONU having a signal transmission speed of 2.4 Gbps, thus making it possible to supply a demodulated upstream frame signal to the upstream frame terminator 1141.

Figure 7:
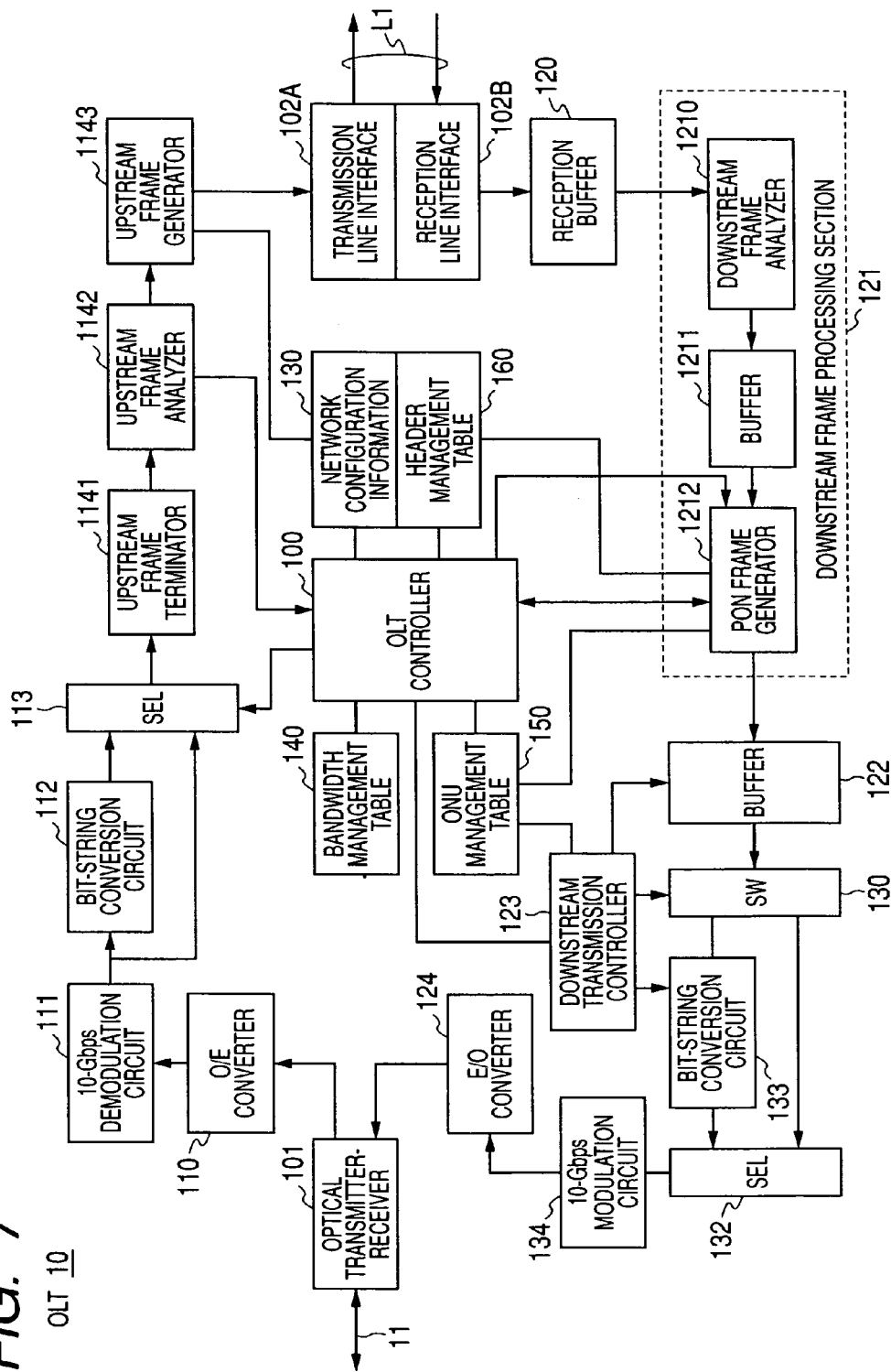
FIG. 7 is a block diagram of the OLT 10 according to a second embodiment of the invention.

FIG. 7 is a block diagram of the OLT 10 according to a second embodiment of the invention.

In the OLT 10 according to the second embodiment, the standard speed of signal transmission is 10 Gbps. In this embodiment, a bit-string conversion circuit 133 is provided between the switch 130 and the selector 132 in the downstream signal processing circuit, and the bit-string conversion circuit 133 converts the bit string of a downstream frame to be transmitted to a 2.4 Gbps-compliant ONU into a 10-Gbps bit string.

For the optical transmitter-receiver 101 of the OLT 10, the transmission/reception of 10-Gbps signals in NRZ (Non Return to Zero) form is a standard mode. FIG. 8A shows the bit string of a frame read from the buffer memory 122 and to be transmitted to a 2.4 Gbps-compliant ONU. The bit-string conversion circuit 133 quadruples the bit rate of the transmission frame as shown in FIG. 8B, and a modulation circuit 134 modulates it at a clock frequency of 10 Gbps, so that a 2.4-Gbps signal can be transmitted as a 10-Gbps optical signal in a pseudo manner as shown in FIG. 8C.

On the other hand, an upstream-frame transmission signal transmitted from each ONU is demodulated by a 10-Gbps demodulation circuit 111, and then converted into a 2.4-Gbps signal by a bit-string conversion circuit 112. The OLT controller 100 allows the selector 113 to select the output of the demodulation circuit 111 at the reception of an upstream frame from a 10 Gbps-compliant ONU, select the output of the bit-string conversion circuit 112 at the reception of an upstream frame from a 2.4 Gbps-compliant ONU, and supply the selected signal to the upstream frame terminator 1141.

FIGS. 9A to 9C show one example of the transmission sequence of downstream frames from the OLT 10 to the ONUs 20.

The OLT 10 transmits a downstream frame at a transmission speed corresponding to the signal transmission/reception speed of the destination ONU of the downstream frame. Accordingly, even though plural ONUs having different signal transmission/reception speeds are connected to the OLT 10, the ONUs 20 can receive optical signals at clock frequencies conforming to the respective signal reception speeds. A synchronous speed is usually of the order of 10 to 500 ns, depending on a clock frequency speed and the performance of a receiver.

In the example of FIGS. 9A to 9C, the OLT 10 divides the transmission bandwidth of downstream frames into a 10-Gbps slot and a 2.4-Gbps slot, as shown in FIG. 9A. The 10 Gbps-compliant ONUs are notified of the start of a downstream communication slot by a communication start notification (control frame) F10-1 transmitted at a signal speed of 10 Gbps, and notified of the end of the downstream communication slot by a communication end notification F12-1 transmitted at a signal speed of 10 Gbps. After the communication start notification F10-1 is transmitted, 10-Gbps downstream data frames (GEM frames) F11-1, F11-2, etc. are transmitted.

In the same manner, the 2.4 Gbps-compliant ONUs are notified of the start of a downstream communication slot by a communication start notification (control frame) F10-2 transmitted at a signal speed of 2.4 Gbps, and notified of the end of the downstream communication slot by a communication end notification F12-2 transmitted at a signal speed of 2.4 Gbps after downstream data frames F21-1, F21-2, etc. are transmitted.

The 10-Gbps communication start notification and the 2.4-Gbps communication start notification contains a clock synchronization bit and bandwidth control information for notifying the ONUs about the bandwidth (or the number of transmission bits) of downstream data frames to be transmitted in each slot. In the case of G-PON, a PCBd (Physical Control Block downstream) which is the header of a GTC frame can be used as a communication start notification F10.

The 10 Gbps-compliant ONUs 20 establish clock synchronization at the time of receiving the communication start notification F10-1 as shown in FIG. 9C and determine port IDs indicated by the headers (GEM headers) of the downstream data frames F11-1, F11-2, etc. to selectively receive a downstream data frame. The 2.4 Gbps-compliant ONUs cannot clock-synchronize to the optical signal of the 10-Gbps communication start notification F10-1, and therefore cannot receive the 10-Gbps frames F10-1, F11-1, and F12-1, as shown in FIG. 9B.

By transmitting the communication end notification F12-1, the OLT 10 allows the 10 Gbps-compliant ONUs to be prepared to stop receiving the 10-Gbps downstream optical signal. The advance notification to stop receiving the 10-Gbps downstream optical signal can prevent the 10 Gbps-compliant ONUs from losing synchronization when the speed of the downstream optical signal is switched from 10 Gbps to 2.4 Gbps at the 2.4-Gbps downstream slot. With the 10-Gbps communication end notification F12-1, the length of the subsequent 2.4-Gbps downstream slot (the number of bits or the bandwidth of the 2.4-Gbps optical signal) may be notified in advance to the 10 Gbps-compliant ONUs. In this case, each ONU can estimate the start of the next 10-Gbps downstream time slot.

In the 2.4-Gbps downstream slot, the OLT 10 performs the same operation on the 2.4 Gbps-compliant ONUs.

Figure 10:
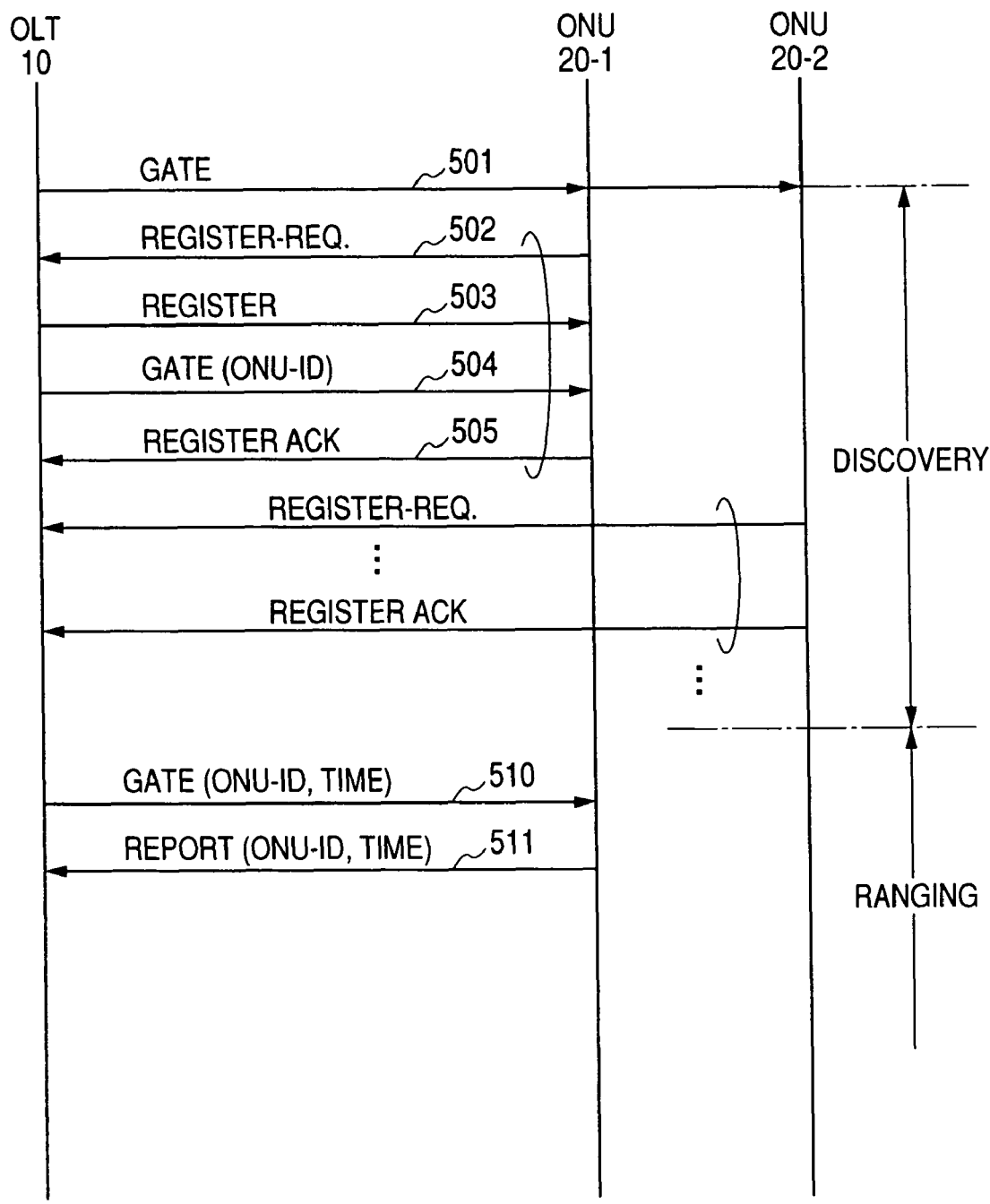
FIG. 10 is a diagram showing a general message sequence of discovery and ranging in the PON system.

FIG. 10 shows a general message sequence of discovery and ranging performed between the OLT 10 and the ONUs 20.

The OLT 10 (OLT controller 100) periodically broadcasts a "GATE" message for discovery to all the ONUs in order to confirm that a new ONU is connected and the currently connected ONUs are operating normally (501). The ONUs that have received the GATE message each transmits a "REGISTER-REQUEST" message containing ONU information to the OLT 10 after a lapse of a random waiting time (502).

When the OLT 10 receives the REGISTER-REQUEST message from the ONU 20-1, the OLT 10 stores the ONU information, and then transmits a "REGISTER" message to the ONU 20-1 (503). Thereafter, the OLT 10 transmits a "GATE" message containing the port ID of the ONU to the ONU 20-1 (504). When the ONU 20-1 which has received the GATE message transmits a "REGISTER-ACK" message to the OLT 10 (505), the discovery processing on the ONU 20-1 ends. The same steps (502 to 505) are repeated for the other ONUs.

Next, ranging will be described.

In the PON system, since the branch optical fibers forming the optical distribution network ODN have different lengths, there occurs a difference in time elapsed between transmission of optical signals from the ONUs 20 and arrival thereof at the OLT 10. For this reason, the OLT 10 measures, by ranging, the physical distances (transmission line lengths) between the OLT 10 and the ONUs 20 to adjust the transmission timing of upstream messages from the ONUs. In ranging, the OLT 10 transmits a GATE message for ranging containing an ONU identifier (port ID), time information, and the like to each ONU (510). When the ONUs receive the respective GATE messages containing the respective port IDs, the ONUs each transmit a REPORT message containing the port ID and time information to the OLT 10 after a lapse of a random waiting time (511).

In the PON system according to the invention, the OLT 10 performs discovery and ranging on plural types of ONUs having different signal transmission speeds.

FIGS. 11A to 11C show one example of a message sequence of discovery performed between the OLT 10 according to the invention and the ONUs 20.

In this embodiment, the OLT 10 transmits a discovery message (GATE) for the 10 Gbps-compliant ONUs and a discovery message (GATE) for the 2.4 Gbps-compliant ONUs in different time slots.

As shown in FIG. 11A, in this embodiment, the OLT 10 transmits a 2.4-Gbps downstream communication start notification F20-1, and then broadcasts a first discovery control frame, that is, a GATE message F21-1 containing a broadcast port ID in the header and to be received by all the 2.4 Gbps-compliant ONUs. After the transmission of the GATE message F21-1, the OLT 10 transmits a 2.4-Gbps downstream communication end notification F22-1. Thereafter, the OLT 10 transmits a 10-Gbps downstream communication start notification F20-2, broadcasts a 10-Gbps GATE message F21-2 to be received by all the 10 Gbps-compliant ONUs, and transmits a 10-Gbps downstream communication end notification F22-2.

As shown in FIG. 11B, the 2.4 Gbps-compliant ONUs such as the ONU 20-1 receive the 2.4-Gbps control frames F20-1, F21-1, and F22-1, and do not receive the 10-Gbps control frames F20-2, F21-2, and F22-2. In the same manner, as shown in FIG. 11C, the 10 Gbps-compliant ONUs such as the ONU 20-2 receive the 10-Gbps control frames F20-2, F21-2, and F22-2, and do not receive the 2.4-Gbps control frames F20-1, F21-1, and F22-1.

The ONU 20-1 transmits a REGISTER-REQUEST message F23-#1 containing ONU information to the OLT 10 after a lapse of a random waiting time RD #1 with respect to the discovery control frame (GATE message) F21-1 (or communication end notification F22-1). The ONU information is, for example, a serial number (SN) in the case of G-PON, or the MAC address of an ONU in the case of GE-PON.

Another 2.4 Gbps-compliant ONU 20-*n* also transmits a REGISTER-REQUEST message F23-#n containing ONU information to the OLT 10 after a lapse of a random waiting time RD #n.

The 10 Gbps-compliant ONU 20-2 transmits a REGISTER-REQUEST message F23-#2 containing ONU information to the OLT 10 after a lapse of a random waiting time RD #2 with respect to the discovery control frame (GATE message) F21-2 (or communication end frame F22-2).

FIGS. 12A to 12D show one example of a message sequence of ranging performed between the OLT 10 according to the invention and the ONUs 20.

As shown in FIG. 12A, the OLT 10 transmits a 2.4-Gbps communication start notification F30-1, sequentially selects the 2.4 Gbps-compliant ONUs which have been confirmed by discovery, transmits a control frame for ranging, that is, a GATE message for ranging containing an ONU identifier (port ID), time information, and the like, and waits for a response from the ONU.

For example, when the OLT 10 transmits a GATE massage F31-1 to the ONU 20-1 having an ONU identifier #1, the ONU 20-1 transmits a REPORT message F32-1 containing time information to the OLT 10 as shown in FIG. 12B. Upon receiving the REPORT message F32-1, the OLT 10 completes the ranging of the ONU 20-1. The OLT 10 then transmits a GATE massage F31-3 containing the ONU identifier of the ONU 20-3 which is the next 2.4 Gbps-compliant ONU, and waits for a response from the ONU. In this case, as shown in FIG. 12C, the ONU 20-3 transmits a REPORT message F32-3 containing time information to the OLT 10.

After the completion of the ranging of all the 2.4 Gbps-compliant ONUs, the OLT 10 transmits a 10-Gbps communication start notification F30-2, sequentially selects the 10 Gbps-compliant ONUs which have been confirmed by discovery, transmits a GATE message for ranging, and waits for a response from the ONU. As shown in FIG. 12D, the 10 Gbps-compliant ONU 20-2 does not respond to the 2.4-Gbps control frames F30-1, F31-1, and F31-3. When the ONU 20-2 receives the 10-Gbps communication start notification F30-2, the ONU 20-2 waits for reception of a GATE message addressed to this node. Upon receiving the GATE message addressed to this node, the ONU 20-2 transmits a REPORT message containing time information to the OLT 10.

FIGS. 13A and 13B show one example of a method for transmitting plural downstream frames (GEM frames) having a same signal transmission speed together in one time slot (TC frame). FIG. 13A shows a 10-Gbps frame queue 122A and a 2.4-Gbps frame queue 122B which are formed in the buffer memory 122.

When the PON frame generator 1212 of the downstream frame processing section 121 shown in FIG. 4 and FIG. 7 generates a GEM frame containing a port ID in the GEM header, the PON frame generator 1212 identifies a signal transmission speed (clock frequency) corresponding to the port ID by referring to the ONU management table 150 and buffers the GEM frame in the frame buffer 122A or 122B corresponding to the signal transmission speed. In FIGS. 13A and 13B, GEM frames are generated in the order of A, B, C, and D.

With 10-Gbps and 2.4-Gbps time slots provided alternately, the downstream transmission controller 123 transmits, for example, a 10-Gbps communication start notification F10-1 in a TC header in a 10-Gbps time slot, sequentially reads GEM frames F11-1 from the 10-Gbps frame queue 122A in a FIFO (First-In First-Out) manner, transmits them using the payload of the TC frame, and transmits a 10-Gbps communication end notification F12-1 at the end of the TC frame. Then, the downstream transmission controller 123 transmits a 2.4-Gbps communication start notification F10-2 in a TC header in a 2.4-Gbps time slot, sequentially reads GEM frames F11-2 from the 2.4-Gbps frame queue 122B in a FIFO manner, transmits them using the payload of the TC frame, and transmits a 2.4-Gbps communication end notification F12-2 at the end of the TC frame.

In the foregoing, the GEM frames grouped according to signal speed and stored in the frame queues 122A and 122B are transmitted in the FIFO manner. However, as shown in FIG. 5B, the ONU management table 150 may store signal transmission speeds (clock frequencies) 152 and priorities 153 in association with ONU identifiers (port numbers), and the PON frame generator 1212 may buffer GEM frames grouped according to priority in the buffer memories 122A and 122B. In this case, the downstream transmission controller 123 sequentially reads GEM frames from a high-priority queue in each slot and reads GEM frames from a low-priority queue when the high-priority queue is empty, thus making it possible to preferentially transmit high-priority frames to ONUs.

In the above embodiments, the OLT 10 successively transmits plural downstream frames having a same signal transmission speed in each of the 10-Gbps and 2.4-Gbps time slots. However, one TC frame may be divided into a 10-Gbps time slot and a 2.4-Gbps time slot, and downstream frame transmission illustrated in FIGS. 9A to 9C may be performed in each time slot.

Although the operation of the PON system according to the invention has been described taking G-PON as an example in the embodiments, the invention is also applicable to other PON systems than G-PON. While a port ID is an ONU identifier in G-PON described in the embodiments, a virtual channel identifier (VPI) in B-PON or a logical link identifier (LLID) in GE-PON can be used as an ONU identifier, that is, a link ID in a PON system. Accordingly, in B-PON or GE-PON as well, by storing a VPI or LLID as an ONU identifier (link ID) and a signal transmission speed (clock frequency) 152 associated therewith in the ONU management table 150, plural types of ONUs having different signal transmission speeds can be accommodated in one OLT.

Further, in the embodiments, the OLT transmits the 2.4-Gbps and 10-Gbps communication start notifications by using the headers of TC frames. However, for example in GE-PON, the OLT can transmit these notifications as individual frames.

According to the PON system of the invention, since plural types of ONUs having different signal transmission speeds can be accommodated in one OLT, the performance of the OLT can be flexibly upgraded without replacing an existing ONU.

What is claimed is:

1. An optical line terminating apparatus (OLT), in a passive optical network (PON), connected to a plurality of types of optical network units (ONUs) having different signal transmission speeds through an optical distribution network, the optical line terminating apparatus comprising:

an optical transmitter-receiver connected to the optical distribution network;

an electrical/optical converter connected to the optical transmitter-receiver;

a transmission/reception line interface connected to a wide area network;

an OLT controller that generates downstream frames;

a downstream frame processing section for converting frames received by the transmission/reception line interface from the wide area network and downstream frames generated by the OLT controller into downstream frames containing identification information on a destination ONU in a header; and a downstream transmission controller, wherein when the downstream transmission controller transmits a new downstream frame at a changed modulation speed, the downstream transmission controller outputs a communication end notification of a current signal transmission speed to the electrical/optical converter, then outputs a communication start notification containing a clock synchronization bit corresponding to a new signal transmission speed to the electrical/optical converter prior to transmission of the new downstream frame, and wherein the electrical/optical converter converts the communication end notification, the communication start notification, and the new downstream frame transmitted from the downstream transmission controller to optical signals and outputs the converted optical signal to the optical transmitter-receiver.

2. The optical line terminating apparatus according to claim 1, further comprising an ONU management table for storing a correspondence relationship between identification information on each ONU and signal transmission speed, wherein the downstream frame is modulated at a signal transmission speed corresponding to identification information on a destination ONU indicated by the ONU management table.

3. The optical line terminating apparatus according to claim 2, wherein the downstream frame processing section stores, in a buffer memory, downstream frames grouped according to signal transmission speed indicated by the ONU management table, the downstream transmission controller modulates a downstream frame read from the buffer memory at a speed corresponding to a signal transmission speed and outputs the modulated frame to the electrical/optical converter.

4. The optical line terminating apparatus according to claim 1, further comprising an ONU management table for storing a correspondence relationship among identification information on each ONU, signal transmission speed, and priority, wherein the downstream frame processing section stores, in a buffer memory, downstream frames grouped according to signal transmission speed and according to priority indicated by the ONU management table, and wherein the downstream transmission controller reads, in order of priority, a downstream frame stored according to signal transmission speed in the buffer memory, modulates the read frame at a speed corresponding to a signal transmission speed, and outputs the modulated frame to the electrical/optical converter.

5. The optical line terminating apparatus according to claim 1, wherein after the downstream transmission controller transmits the communication start notification, the downstream transmission controller outputs a plurality of downstream frames having a same signal transmission speed to the electrical/optical converter.

6. The optical line terminating apparatus according to claim 1, further comprising:

an optical/electrical converter connected to the optical transmitter-receiver;

a demodulation section for demodulating a reception signal outputted from the optical/electrical converter at a speed corresponding to a signal transmission speed;

an upstream frame processing section connected between the demodulation section and the transmission/reception line interface; and an OLT controller connected to the upstream frame processing section, wherein the OLT controller generates a plurality of discovery frames grouped according to signal transmission speed, and wherein the downstream transmission controller modulates a discovery frame generated by the OLT controller at a speed corresponding to a signal transmission speed of an ONU subject to discovery, and outputs the modulated frame to the electrical/optical converter.

7. The optical line terminating apparatus according to claim 6, wherein the OLT controller generates a plurality of ranging frames grouped according to signal transmission speed, and wherein the downstream transmission controller modulates a ranging frame generated by the OLT controller at a speed corresponding to a signal transmission speed of an ONU subject to ranging, and outputs the modulated frame to the electrical/optical converter.

8. An optical line terminating apparatus (OLT), in a passive optical network (PON), connected to a plurality of types of optical network units (ONUs) having different signal transmission speeds through an optical distribution network, the optical line terminating apparatus comprising:

an optical transmitter-receiver connected to the optical distribution network;

an electrical/optical converter connected to the optical transmitter-receiver;

a transmission/reception line interface connected to a wide area network;

an OLT controller that generates downstream frames;

a downstream frame processing section for converting frames received by the transmission/reception line interface from the wide area network and downstream frames generated by the OLT controller into downstream frames containing identification information on a destination ONU in a header; and a downstream transmission controller for converting a bit string of each downstream frame into a bit string corresponding to a standard signal transmission speed if a signal transmission speed of the destination ONU of the downstream frame is slower than the standard signal transmission speed, wherein when the downstream transmission controller transmits a new downstream frame at a changed modulation speed, the downstream transmission controller outputs a communication end notification of a current signal transmission speed to the electrical/optical converter, then outputs a communication start notification containing a clock synchronization bit corresponding to a new signal transmission speed to the electrical/optical converter prior to transmission of the new downstream frame, and wherein the electrical/optical converter converts the communication end notification, the communication start notification, and the new downstream frame transmitted from the downstream transmission controller to optical signals and outputs the converted optical signal to the optical transmitter-receiver.

9. A passive optical network (PON) system including an optical line terminating apparatus (OLT) connected to a wide area network and a plurality of types of optical network units (ONUs) having different signal transmission speeds and connected to the OLT through an optical distribution network, the OLT comprising:

an OLT controller that generates downstream frames;

an optical transmitter-receiver connected to the optical distribution network;

an electrical/optical converter connected to the optical transmitter-receiver;

a downstream frame processing section for converting a control packet generated by the OLT controller and frames received from the wide area network into downstream frames containing identification information on a destination ONU in a header;

a downstream transmission controller;

a demodulation section for demodulating an output signal of the optical/electrical converter at a speed corresponding to a signal transmission speed; and an upstream frame processing section connected to the demodulation section, wherein the OLT transmits and receives frames having different signal transmission speeds through the optical distribution network, wherein when the downstream transmission controller transmits a new downstream frame at a changed modulation speed, the downstream transmission controller outputs a communication end notification of a current signal transmission speed to the electrical/optical converter, then outputs a communication start notification containing a clock synchronization bit corresponding to a new signal transmission speed to the electrical/optical converter prior to transmission of the new downstream frame, and wherein the electrical/optical converter converts the communication end notification, the communication start notification, and the new downstream frame transmitted from the downstream transmission controller to optical signals and outputs the converted optical signal to the optical transmitter-receiver.

* * * * *